United States Patent  (10) Patent No.: US 9,238,442 B2
Åsbogård  (45) Date of Patent: Jan. 19, 2016

(54) ENERGY MANAGEMENT SYSTEM OF A VEHICLE

(75) Inventor: Mattias Åsbogård, Mölnlycke (SE)

(73) Assignee: Volvo Lastvagnar AB, Göteborg (SE)

( * ) Notice: Subject to any disclaimer, the term of this patent is extended or adjusted under 35 U.S.C. 154(b) by 64 days.

(21) Appl. No.: 14/118,021

(22) PCT Filed: May 16, 2011

(86) PCT No.: PCT/EP2011/002406
§ 371 (c)(1),
(2), (4) Date: Nov. 26, 2013

(87) PCT Pub. No.: WO2012/155927
PCT Pub. Date: Nov. 22, 2012

(65) Prior Publication Data
US 2014/0094996 A1    Apr. 3, 2014

(51) Int. Cl.
*B60R 16/033* (2006.01)
*B60R 16/03* (2006.01)
*B60W 10/08* (2006.01)
*B60W 10/30* (2006.01)
*B60W 20/00* (2006.01)

(52) U.S. Cl.
CPC ............... *B60R 16/033* (2013.01); *B60R 16/03* (2013.01); *B60W 10/08* (2013.01); *B60W 10/30* (2013.01); *B60W 20/00* (2013.01); *B60W 20/102* (2013.01); *B60W 2550/402* (2013.01)

(58) Field of Classification Search
CPC ..... B60R 16/033; B60R 16/03; B60W 20/00; B60W 10/30; B60W 10/08; B60W 20/102; B60W 2550/402
See application file for complete search history.

(56) References Cited

U.S. PATENT DOCUMENTS 6,301,528 B1  10/2001  Bertram
2004/0232769 A1  11/2004  Pickering
2010/0312425 A1  12/2010  Obayashi et al.

FOREIGN PATENT DOCUMENTS

DE  102008007119 A1  8/2009
EP  2151904 A2  2/2010
WO  2006132760 A2  12/2006

OTHER PUBLICATIONS

Wikipedia, Power steering, printed Mar. 30, 2015.*
International Search Report (Dec. 7, 2011) for corresponding International Application No. PCT/EP2011/002406.
International Preliminary Report on Patentability (Jul. 22, 2013) for corresponding International Appliaction No. PCT/EP2011/002406.

* cited by examiner

*Primary Examiner* — John Q Nguyen
*Assistant Examiner* — Alan D Hutchinson
(74) *Attorney, Agent, or Firm* — WRB-IP LLP

(57) ABSTRACT

An energy management system (EMS) controls the energy flows in a vehicle by adapting pricing rules. In the EMS the price (Pm, P2, PB1) of the energy is variable dependent of the momentary supply of energy in a global energy system, i.e. the vehicle. Each auxiliary system (GEN, B, C) in the global energy system has in individual price limit, above which the auxiliary system (GEN, B, C) won't purchase any more energy. Some auxiliary systems (B) have variable price limits depending of those auxiliary systems parameters. The auxiliary systems (GEN, B, C) are represented in the EMS by activation agents (CA1, CA2, CAn, BA1, BAn), which have different behavior depending of what kind of auxiliary system they represent. Said activation agents (CA1, CA2, CAn, BA1, BAn) control the energy flows in the global energy system. In the EMS the energy systems are divided into two categories; energy main system and energy auxiliary systems.

15 Claims, 4 Drawing Sheets

ENERGY MANAGEMENT SYSTEM OF A VEHICLE

BACKGROUND AND SUMMARY

The present invention relates to the field of energy management systems of a vehicle, and especially a vehicle with a combustion engine and a plurality of auxiliary systems.

Auxiliary systems are used in all modern vehicles. The auxiliary systems convert or consume) energy and their primary purpose is not to propel the vehicle. Examples of auxiliary systems are coolant pumps, oil pumps, air condition systems and fans. The operation of auxiliary systems represents about 3-30% of a vehicles fuel consumption, depending of the vehicle application and the operational environment.

Today, most of the auxiliary systems found in commercial heavy vehicles are not used in an energy efficient way. The control of different auxiliary systems is usually decoupled and sub optimised, which leads to an unnecessary high fuel consumption. Further, an individual optimisation of the auxiliary systems, leads to a poorer overall performance and problems in the interface between the different systems.

US2010/0322425 discloses an example of prior art energy management system used to manage energy to be supplied to a system.

There is thus a need for an improved system to control the energy auxiliary systems in an energy efficient way. Further, it is desired that such a system is low in developing and implementation costs.

It is desirable to provide an inventive system for energy management of a vehicle, which reduces the fuel consumption of the vehicle and which is easy to implement and at which auxiliary systems easily can be connected and disconnected, without the need for changes in the system control.

The invention grounds, according to an aspect thereof, upon the idea that the energy flows of a vehicle can be controlled dependent of the momentary supply and demand of energy in the energy system. By defining simple rules of how the energy is distributed, from the energy main system and to and between the auxiliary systems, a simple and efficient energy management system can be achieved. In the inventive EMS the energy is thereby traded between the energy main system and the auxiliary systems, wherein the primary energy source, i.e. the combustion engine, is the primary source of pricing. Basically, the price will be low when the combustion engine running with a high efficiency or during braking and the price high when the combustion engine running with a low efficiency. The auxiliary systems thereby purchases energy from the combustion engine when they have an energy demand, whereby the auxiliary systems has an individual price limit above which they do not purchase any energy.

The inventive EMS controls the energy flows in the vehicle by adapting the pricing rules. In the EMS the price of the energy is variable dependent of the momentary supply of energy in a global energy system, i.e. the vehicle. Each auxiliary system in the global energy system has an individual price limit; above which the auxiliary system won't purchase any more energy. Some auxiliary systems have variable price limits depending of those auxiliary systems parameters. The auxiliary systems are represented in the EMS by activation agents, which have different behaviour depending of what kind of auxiliary system they represent. Said activation agents control the energy flows in the global energy system in the EMS the auxiliary systems are divided into two categories; energy buffers and energy converters.

The energy main system provides the energy to the vehicle. The energy main system could be the fuel tank, the combustion engine, or the combustion engine including one or more auxiliary systems such as a cooling fan and a generator or an electric machine, wherein an electric machine is able to work as a generator or a motor.

The energy auxiliary systems are defined in two sub-categories; energy buffers and energy converters. An energy buffer is any system in the vehicle that can store energy, where the most obvious one is a battery. Other possible energy buffers are the cooling water, a pressure tank or the passenger compartment. All buffers are however not able to provide energy to other auxiliary systems, but just buffer within itself to reduce the future need of energy. For example the temperature in the passenger compartment can be allowed to oscillate within a range not noticeable fir the passenger. In periods with low price of the energy the temperature can be raised above the ideal temperature, such that the later on, the temperature can slowly decrease during period with higher price on energy. An energy converter converts energy from one form to another, such as a power steering device (electric energy to kinetic energy), a generator (kinetic energy to electric energy), a heater (electric energy to heat), a cooling fan (electric energy to kinetic energy) and/or any kind of actuator (electric energy to kinetic, energy).

The minimum setting of the inventive EMS comprises an energy main system, an energy buffer and an energy converter. However, any number of sub-system be added to the EMS, which will be able to manage the energy flows within the system with the same principles independently of how many sub-systems that is added to the minimum setting. For simplicity reasons a system with the minimum requirements having an energy main system, an energy buffer and an energy converter will be explained, wherein the energy main system comprises a combustion engine and an electric generator.

The energy main system is represented in the EMS by an energy main system activation agent (ms-agent). The energy buffer is represented in the EMS by an energy buffer activation agent (b-agent) and the energy converter is represented in the EMS by an energy converter activation agent (c-agent). The activation agents activate and deactivate their respective auxiliary system and controls that their energy needs is required through the EMS and that the energy is required from the energy source with the lower pricing, i.e. the energy main system or an energy buffer.

The ins-agent sets a first price for energy provided from the energy main system, wherein the first price is dependent of energy main system specific parameters. These parameters are dependent of how the energy main system is defined, but having the combustion engine as the energy main system, the parameters could be efficiency of the combustion engine, whereby the currency would be the amount of fuel needed, having the combustion engine and a generator as the energy main system the parameter would be the combined efficiency of these two components.

The b-agent purchases energy either from the ms-agent for said first price, or from another b-agent selling from a price lower than said first price, whereby the energy buffer is provided with energy from the source with the lowest price.

The b-agent sets a second price for energy provided from the energy buffer, wherein the second price is dependent of energy buffer specific parameters. Said energy buffer specific parameters preferably comprise a mean value of the purchase price of the purchased energy it the buffer and buffer efficiency.

The c-agent purchases energy from either the ms-agent or the b-agent dependent of which of the first price and the second price that is the lowest price. Obviously if there are more energy buffers connected to the system, the c-agent also can chose to buy from these, if they provide a lower price.

The b-agent and the c-agent has an individual price limit for purchasing energy, wherein the b-agent and c-agent just purchases energy if it can find a price which is lower than the individual price limit for that b-agent and c-agent respectively.

The inventive EMS ensures that the components that have the highest need always will be supplied with energy, and that that energy is taken from the most beneficial source. That is, if the combustion engine is driven in a mode with low efficiency, a component in the need of power will be delivered its power from one of the energy buffers in the system, with the condition that the energy buffer is a state of charge such that it can sell energy for a price lower than the inefficient working combustion engine. During periods of high pricing both from the combustion engine and the energy buffers, some systems might not be provided with any energy, if their individual price limit is lower than all the energy prices in the EMS.

All information needed between the activation agents is contained in the price and in the requested energy purchase. When price increases, purchase will decrease and individual system will use the content of their buffers. The primary source of pricing is the combustion, engine; the price will be low when running at high efficiency or during a braking operation, otherwise higher.

The inventive EMS further coordinates and optimises the operation of different auxiliary systems on a global level. Due to the inventive EMS the auxiliary systems are automatically and continuously adapted to the vehicles operation cycle. Adding further auxiliary systems to the vehicle and the EMS is easily done, since the individual auxiliary systems must act in the EMS under the same conditions as the existing auxiliary systems, wherein the need for manual tuning of added auxiliary systems are minimised. The newly added auxiliary system becomes an activation agent in the EMS, wherein the development costs for adding additional auxiliary systems to the global energy system can be reduced, due to the simple connection and adaption in a generic and structured control design.

Further, due to the inventive EMS, the different auxiliary systems are coordinated and optimised globally, wherein fuel consumption of the vehicle can be reduced, since the auxiliary systems uses the energy resources in the most efficient way.

Depending on how the energy main system is defined, some b-agents and c-agents can require energy for their auxiliary system directly from the ms-agent and some never directly there from. For example if the generator is comprised in the energy main system, the energy main system can deliver electric energy, wherein a plurality of b-agents and/or c-agents can purchase energy directly from the ms-agent. However, if the generator is not comprised in the energy main system, these b-agents and c-agents must purchase the energy needed for their auxiliary systems from the c-agent representing the generator in the EMS.

In a preferred embodiment of the invention, the individual price limit at which the activation agents seize to purchase energy is fixed for the c-agent and variable for the b-agent. Hence, energy converters represented by their c-agent has a priority order which is reflected in their individual price limn, the higher price limit an energy converter has, the more important it is for the vehicle that this auxiliary system are supplied with energy. For example, the heating of the passenger compartment has a lower individual price limit than the power steering. The fix individual price limit for the energy converters secures that the prioritised functions of the vehicle always can be supplied with energy.

For the energy buffer, the individual price limit is variable and preferable dependent of the state of charge for the energy buffer, such that if the energy buffer has a high state of charge its individual price limit is decreased and if the energy buffer has a low state of charge its individual price limit is increased. The variable individual price limit for the energy buffers secures that the energy buffer always is kept in a decent state of charge, such that there always is an energy buffer in the energy system.

It is preferred the variable price limit set by the b-agent depends on a state of charge of the energy buffer and the out price set by the b-agent. By including the out price of the energy from the energy buffer in the variable purchasing price limit for the energy buffer, a constant out price increase or decrease from the energy buffer is avoided.

As previously mentioned, further energy auxiliary systems of the vehicle can be connected to the inventive EMS, wherein additional energy auxiliary systems are connected to the EMS as converters and/or buffers. Wherein all buffers do not necessary have to be able to deliver energy to other auxiliary systems, just have the capacity to store energy and using it for its own function, for example the heating for the drivers/passenger compartment, which can allow an overheating, i.e. a higher temperature than the set one, during periods with cheap energy and allow a temperature below the set one during periods with expensive energy. Obviously the over and under heating is set such that it does not conflict with the comfort of the driver and/or passengers.

In a version of the inventive EMS, the EMS communicates with a travel computer of the vehicle, such that the EMS can predict an upcoming travel route. The travel computer can be any kind of travel computer, such as a satellite-based navigation system available for the driver of the vehicle or as a black box system just available to the vehicles ECU, Even though satellite-based navigation systems are the most common navigation systems, any other kind of navigation system based on other technology are possible. By using the information of from the travel computer, the EMS can have access to data of the upcoming route; such data could be topology data. The EMS can thereby predict future energy scarcities or abundances.

In a situation when the energy EMS has predicted future energy abundance, such as a long downhill slope, the EMS can add a tax to the first price, which thereby increases. By adding said tax, less purchases of energy is made directly from the energy main system, during the period that the tax is added, wherein the auxiliary system uses energy from the energy buffers, or does not purchase energy at all. Whereby the energy consumption will sink, since the state of charge of energy buffers consequently will sink. The total energy demand from the energy main system will slowly rise, wherein when the vehicle is in the state that it has an abundance of energy, all systems will be able to purchase energy and the state of charge of the energy buffers will increase, since cheap energy is available.

During these periods of abundance of energy, the EMS can subsidize the first price, in order to encourage a loading the energy buffers. A subsidize of the energy is could also be beneficial when conditions which influence the first price to rise are predicted, whereby the energy buffers can be filled before an energy scarcity is reached.

The boundaries of the energy main system can be defined as the combustion engine, or the combustion engine and a generator or even the fuel tank. Other boundary definitions are also possible. For example, if the fuel tank is the energy main system, a first energy converter would be the combustion engine, which purchases energy from the fuel tank for a first price and purchases energy to the generator for a second price, wherein the second price is dependent of the efficiency of the combustion engine. The generator purchases energy from the combustion engine for the second price and purchases energy to other auxiliary system for a third price dependent of the efficiency of the generator. However, in a preferred embodiment, the energy main system is defined as the combustion engine together with the generator, this because the energy flow from the fuel tank to the generator does not have an branches and flows only in one direction. Hence the first price set, i.e. out from the energy main system is dependent of the total efficiency of the energy main system.

The energy main system could even be comprised of a plurality of energy sources, which delivers energy to one common price dependent of the total efficiency of the energy main system. However, the EMS is adapted to a vehicle with a combustion engine, wherein such a plurality of energy sources comprises at least one internal combustion engine, such as a diesel engine.

An obvious energy buffer is a battery or a pack of batteries, wherein a plurality of batteries and/or other energy buffers can be connected to the EMS.

Common energy converters in an EMS adapted to a vehicle is an oil pump and/or a radio and/or a heating device and/or a steering servo and/or a braking servo, other all other not mentioned energy converters of a vehicle is also suitable to connect to the inventive EMS.

BRIEF DESCRIPTION OF THE DRAWINGS

The present invention will now be described in detail with reference to the figures, wherein.

DETAILED DESCRIPTION

In the following only a selection of embodiments of the invention is shown and described, simply by way of illustration of some mode of carrying out the invention.

Figure 1:
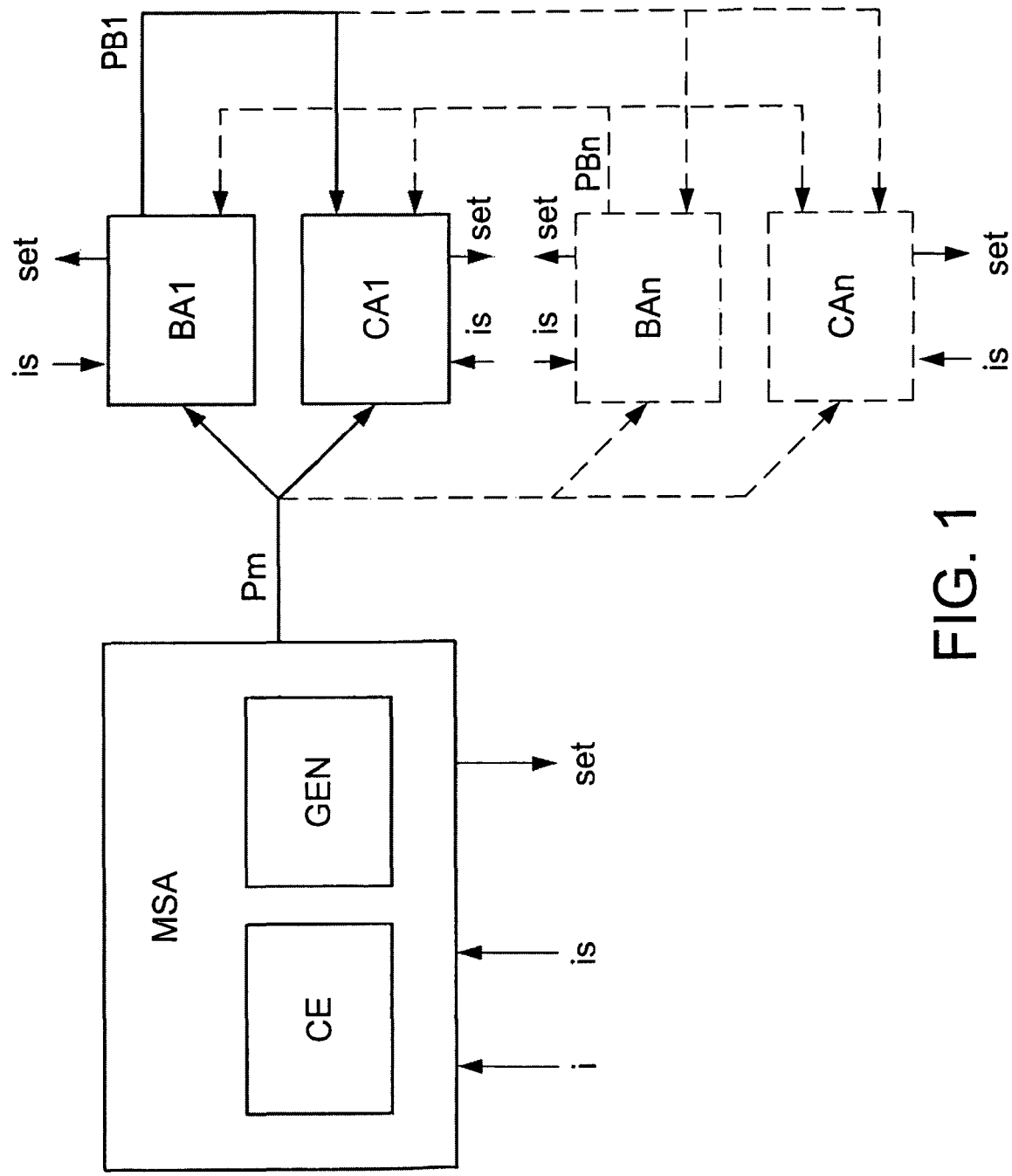
FIG. 1 discloses a schematic drawing of a first embodiment of the inventive EMS.

FIG. 1 shows a first embodiment of the inventive EMS, which controls an energy system comprising a combustion engine CE, a generator GEN, an energy buffer and an energy converter, said combustion engine CE and said generator GEN together constitute the energy main system. Further, auxiliary devices might be connected directly to the combustion engine CE, wherein these thereby influences the out price Pm from the energy main system, since they lower the efficiency of the same.

The energy system could be could be extended to comprise further energy main systems or further energy auxiliary devices.

The energy main system is represented in the EMS by the energy main system agent (ms-agent) MSA, an energy buffer is represented in the EMS by an energy buffer agent (b-agent) BA1 and an energy converter is represented in the EMS by an energy converter agent (c-agent) CA1. Additional auxiliary devices could be connected to the energy system; these are represented in the EMS by their individual activation agents BAn. CAn, in the figures these are shown with dashed lines. The number n of additional auxiliary devices for the EMS is unlimited. However, the description will focus on a small system with just one energy buffer and one energy converter, whereby an EMS controlling further devices functions in the same way.

In FIG. 1, the boxes MSA, BA1, CA1, BAn, CAn symbolises the trading agents, wherein the arrows between the boxes symbolises the trading paths for the energy. The arrows "I", "is" and "set" in and out from the boxes symbolises information that is send to and from the trading agents MSA, BA1, CA1, BAn, CAn.

Figure 2:
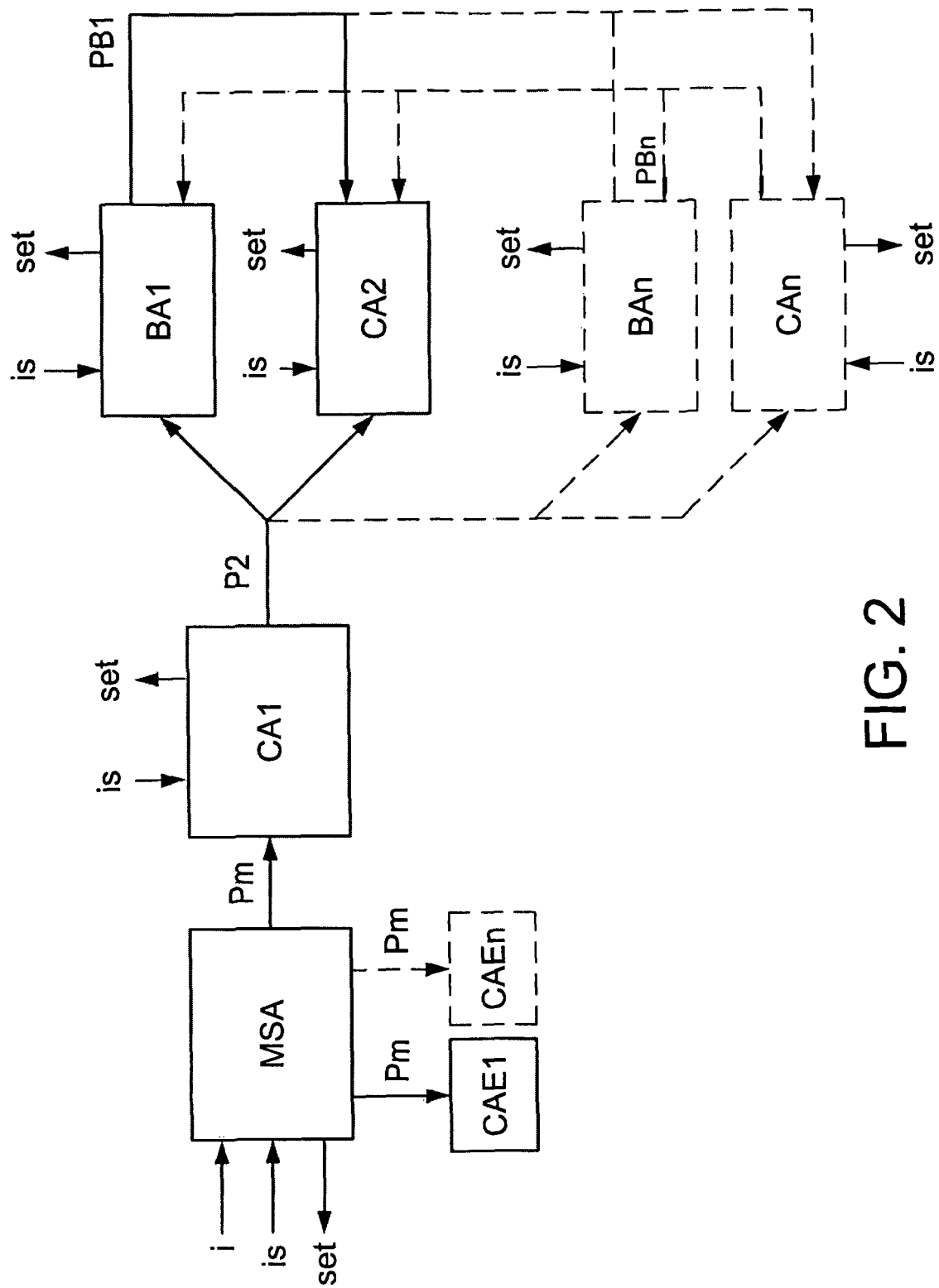
FIG. 2 discloses a schematic drawing of a second embodiment of the inventive EMS.

The ins-agent MSA receives information i, which can be information about the position of the vehicle, the upcoming route or any other relevant information, it further receives information is from the energy main system, which information is comprises the momentary working state of the energy main system. Whereby the ms-agent uses the received information is to calculate the first price Pm for the energy, which the energy main system delivers to the auxiliary systems. The first price Pm is based upon the efficiency of the whole energy main system. The ms-agent also sends information set to the local controller of the energy main system, which information comprises the energy demand from the auxiliary systems. The local controller thereby controls the energy main system such that the demanded energy can be delivered. The energy main system in the example shown in FIG. 1 auxiliary systems using energy directly from the combustion engine included in the energy main system, and therefore seen as losses and thereby decreases the efficiency of the energy main system. In FIG. 2 another embodiment of the EMS is shown for which such auxiliary systems also acts in the EMS The b-agent BA1 receives information is about the energy buffers status, such as state of charge (SoC) and its efficiency, the b-agent further records the price of the energy that it has purchased for the energy (i.e. the energy stored in the energy buffer) and calculates a mean value for the stored energy. Based on the mean value for the stored value of energy in the energy buffer and the efficiency of the energy buffer and the SoC of the energy buffer the b-agent sets a second price PB1 for energy that is purchased from the energy buffer. The b-agent PB1 also sends information set to the energy buffers local controller, such that it controls the energy buffer to fulfill the energy purchases ordered by b-agent. PB1

The c-agent CA1 receives information is about the energy converters status, i.e. its energy demand. If there is an energy demand from the energy converter, the c-agent purchases energy from that of the available sources (energy buffers and energy main system) that have the lowest price Pm, PB1, and is lower than the energy converters individual highest purchase price. The c-agent sends information set to the local controller of the energy converter, which demands the needed energy from the correct energy source.

An EMS with a plurality n of energy converters and buffers functions in the same way, with the only difference that the activations agents BA1, CA1, BAn, CAn have more options from where they should purchase or sell the energy for/of their respective auxiliary system.

In FIG. 2 a second embodiment of the inventive EMS is disclosed. The difference between the EMS in FIG. 1 and the EMS in FIG. 2 is that in the EMS in FIG. 2, the combustion engine alone is the energy main system, represented by the ms-agent MSA, whereby auxiliary systems receiving energy directly from the combustion engine are not seen as energy losses, which increases the price Pm of the energy through a lower efficiency of the energy main system. Instead also these auxiliary systems purchases energy from the energy main system for the same price Pm as the other auxiliary systems. These auxiliary systems acts in the EMS with the same conditions as the other components and are represented by their activation agents CAE1, CAFn. However, these auxiliary systems normally do not have access to the energy buffers, since they use kinetic energy from the combustion engine, they can however be buffers themselves, and store energy for their own purpose, for example, a compressor directly driven by the combustion engine and connected to a compressor tank.

Further in the EMS shown in FIG. 2, the first energy converter is the generator, which is represented by its c-agent CA1 in the EMS, whereby the c-agent CA1 purchases energy from the ms-agent MSA. The generator converts it to electric energy, which is distributed the other auxiliary systems in the energy system dependent of the c-agents and b-agents purchases for their respective auxiliary system. The second energy price P2, out from the generator is obviously higher than the first energy price Pm out from the energy main system, because in the second energy price P2 the losses in the conversion are added to the price P2. The c-agent CA1 of the generator receives is and sends set information to and from the local controller of the generator in order to know how to act in the EMS and to instruct the local controller how to control the generator to deliver the there from purchased energy.

Figure 3:
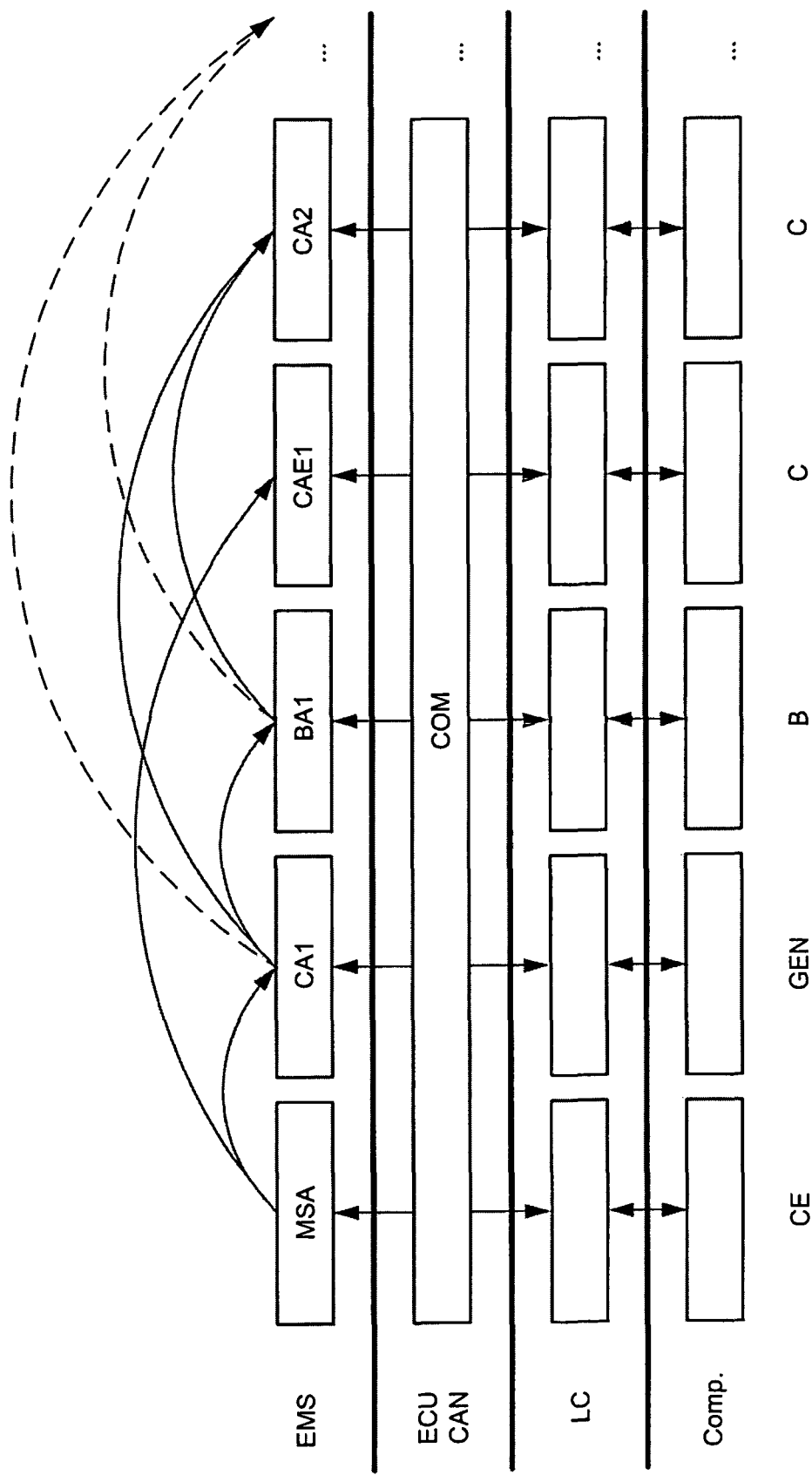
FIG. 3 discloses an overview of the control architecture of the inventive EMS, and FIG. 4 discloses a schematic diagram of an individual price limit curve of an energy buffer in the inventive EMS.

In FIG. 3 an overall view of the implementation of the inventive EMS is disclosed, wherein the EMS is the top layer, at which the pricing, selling, and purchasing of the energy is performed between the activation agents MSA, CA1, BA1, CAE1, CA2. The trading agents are controlled by the ECU and communicate with each other and with their respective components CE, GEN, B, C local controller LC over the CAN-system of the vehicle. The trading agents can actually be distributed among several ECUs in order to spread the load of the load thereon, wherein the communication between the trading, agents is performed using the CAN-bus of the vehicle. This is possible, due to the compact and well defined interface of the trading, agents. The local controller LC of each component CE, GEN, B, C controls the component CE, GEN, B, C such that it functions within its limits and activates and deactivates the component CE, GEN, B, C on the demand from its respective trading agent MSA, CA1, BA1, CAE1, CA2. The local controller LC sends information about the status to the respective trading agent in the EMS, and receives information about purchases from the respective trading agent in the EMS.

Figure 4:
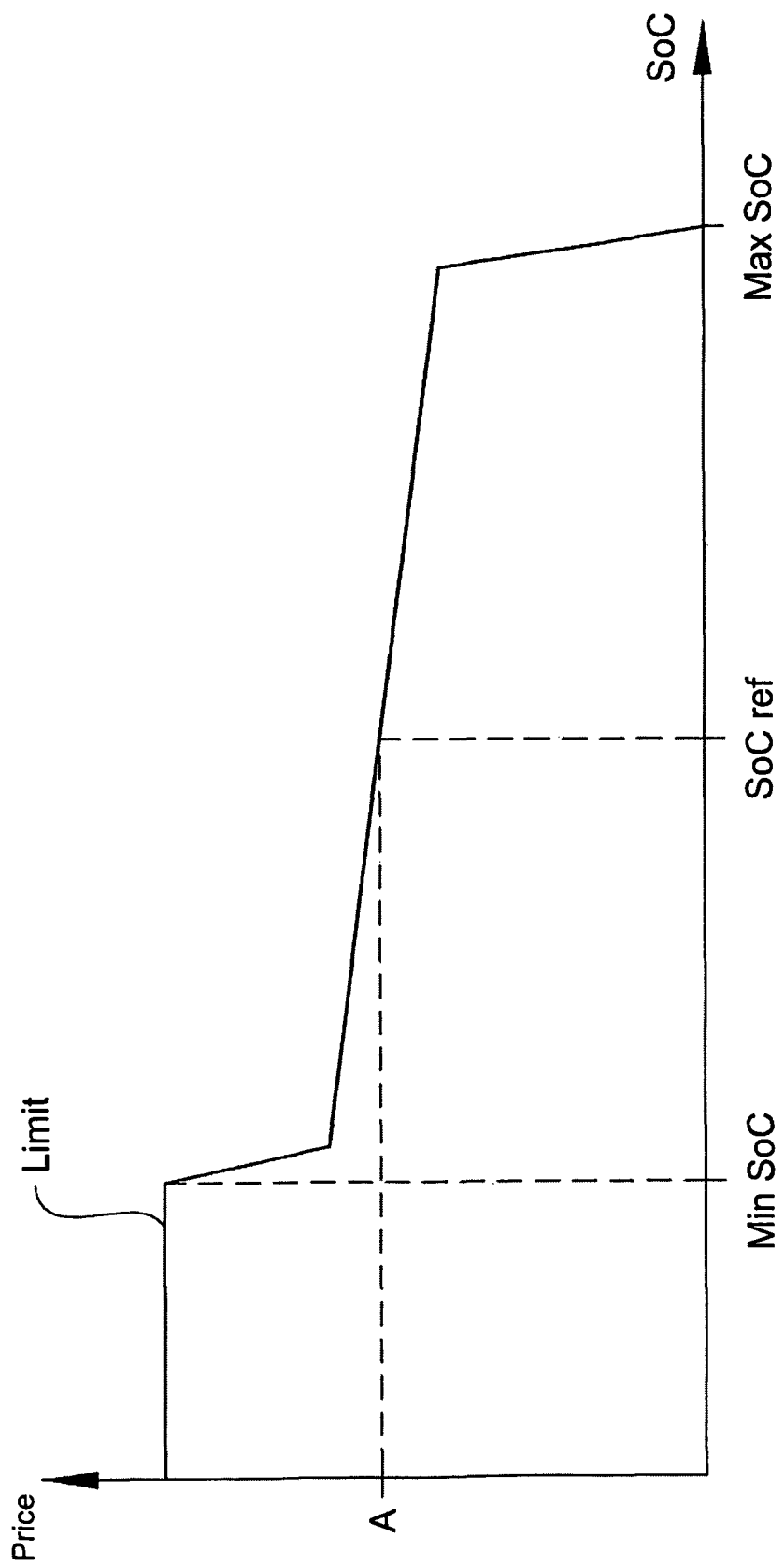

The b-agent is the only trading agent in the EMS that have variable price limit at which its stops purchasing energy. An example of a variable price limit curve of a b-agent is shown in FIG. 4. In the diagram in FIG. 4 it can be seen that at a low SoC the price limit at which the b-agent purchases energy for the energy buffer B is increasing. When the SoC reaches a minimum value Min Soc the maximum individual price limit is reached. When the energy buffer B is fully loaded the b-agent want purchase any energy at all. The energy buffer B has a floating average A of the price of the purchased energy in the energy buffer B, this average is a variable of the price of the energy purchased from the energy buffer B. The average price A of the purchased energy in the energy buffer B is also the momentary selling price for energy purchased from the energy buffer B.

The inventive EMS facilitates a global optimisation of the control of the auxiliary systems, which leads to a reduced fuel consumption. Further less work is required to design the control function, this because new components can easily be adapted to the global rules of the EMS. Further, the inventive EMS automatically and continuously adapts to the momentary conditions of the vehicles operational cycle, since the price of the energy is dependent of the efficiency of the combustion engine. By adding a tax or subsidise the price of the energy, an EMS that adapts to upcoming situations of the vehicle, such that an even greater reduction of fuel consumption of the vehicle is achieved.

The invention is not limited to the specific embodiments and charts presented, but include all variations within the scope of the present claims. Accordingly, the drawings and the description thereto are to be regarded as illustrative in nature, and not restrictive.

The invention claimed is:

1. A method to control energy flows of a vehicle, wherein the vehicle comprises
    an energy management system (EMS) comprising at least one vehicle engine control unit,
    an energy main system, the energy main system being arranged to provide energy to the vehicle, and
    a plurality of energy auxiliary systems, each of the plurality of energy auxiliary systems comprising at least an energy buffer configured to store energy and an energy converter configured to convert energy from one form to another,
    the method comprising
    setting, using the EMS, a first price for energy provided from the energy main system, wherein the first price is dependent of energy main system specific parameters, and
    setting, using the EMS, a price for energy provided from each of respective ones of the plurality of energy auxiliary systems, wherein the price for the energy from each of the respective ones of the plurality of energy auxiliary systems is dependent of parameters of each respective energy auxiliary system,
    selecting, using the EMS, the one of the energy main system and any one of the plurality of energy auxiliary systems for which the lowest price is set, and
    providing, under control of the EMS, energy from the selected energy auxiliary system to each energy auxiliary system of the plurality of energy auxiliary systems that was not selected, wherein
    the energy buffer and the energy converter for each of the respective ones of the plurality of energy auxiliary systems has an individual price limit for being provided with energy, and the energy buffer and the energy converter only is provided with energy if they can be provided with energy to a price which is lower than the individual price limit for that energy buffer and energy converter.

2. The method according to claim 1, wherein the buffer specific parameters comprises a mean value of a price of the energy provided in the energy buffer and a buffer efficiency.

3. The method according to claim 1, wherein the individual price limit is fixed for the energy converter and variable for the energy buffer.

4. The method according to claim 1, wherein the individual price limit for the energy buffer is variable and depends on a state of charge of the energy buffer and a second price for energy provided by an energy buffer activation agent.

5. The method according to claim 1, wherein additional energy auxiliary systems are comprised in the vehicle as converters and/or buffers.

6. The method according to claim 1, wherein the vehicle comprises a travel computer, whereby an upcoming travel route can influence the set prices.

7. The method according to claim 6, wherein a tax is added to the first price when conditions which influence the first price to be lowered are predicted.

8. The method according to claim 6, wherein the first price is subsidized when conditions which influence the first price to rise are predicted.

9. The method according to claim 1, wherein the energy main system is an engine or a fuel tank.

10. The method according to claim 1, wherein the energy main system comprises a plurality of energy sources.

11. The method according to claim 10, wherein the plurality of energy sources comprises at least one internal combustion engine, such as a diesel engine.

12. The method according to claim 1, wherein the energy buffer is a battery.

13. The method according to claim 1, wherein the energy converter is an oil pump and/or a radio and/or a heating device and/or a steering servo and/or a braking servo and/or any other auxiliary system in a vehicle.

14. A vehicle comprising an internal combustion engine, a plurality of auxiliary systems and an energy management system (EMS), wherein the energy distribution from the internal combustion engine out to the auxiliary systems is handled by the EMS according to the method of claim 1.

15. A vehicle according to claim 14, wherein the internal combustion engine is the energy main system and the auxiliary systems comprises at least an alternator, a battery and a steering servo.

* * * * *